United States Patent

[11] 3,534,826

| [72] | Inventors | Dan H. Dane;<br>Herman T. Blaise, Huntsville, Alabama |
|---|---|---|
| [21] | Appl. No. | 752,947 |
| [22] | Filed | Aug. 15, 1968 |
| [45] | Patented | Oct. 20, 1970 |
| [73] | Assignee | the United States of America as represented by the Administrator of the National Aeronautics and Space Administration |

[54] AIR-CUSHION LIFT PAD
9 Claims, 4 Drawing Figs.

[52] U.S. Cl. .................................................. 180/118, 180/121
[51] Int. Cl. .................................................. B60v 1/06
[50] Field of Search ........................................ 180/116, 125, 121, 118

[56] References Cited
UNITED STATES PATENTS

| 2,780,826 | 2/1957 | Coons et al. .................. | 180/116 |
| 2,889,570 | 6/1959 | Duff .............................. | 180/116X |
| 3,195,665 | 7/1965 | Beardsley ..................... | 180/116 |

Primary Examiner— A. Harry Levy
Attorneys— L. D. Wofford, Jr., G. J. Porter and G. T. McCoy

ABSTRACT: A platform having several ground effect pads is supported in a substantially frictionless manner over a surface. Each pad has a plenum chamber with an open bottom which enables pressurized air to support the pad above the surface. The load of the platform is applied to the top center of each pad. The upper wall of the pad converges downwardly from the side wall of the plenum chamber whereby the center of lift of the resultant pressure is above the point of application of the load.

Patented Oct. 20, 1970

3,534,826

DAN H. DANE
HERMAN T. BLAISE
INVENTORS

BY *[signatures]*

ATTORNEYS 3,534,826

AIR CUSHION LIFT PAD

The invention described herein was made by employees of the U.S. Government and may be manufactured and used by or for the Government for governmental purposes without the payment of any royalties thereon or therefor.

BACKGROUND OF THE INVENTION

1. Field of the Invention

The present invention relates to devices utilizing a ground effect and more specifically to those utilizing an air cushion of pressurized air to support the device above a surface.

2. Description of the Prior Art

There are two distinct air cushion techniques for supporting a device such as a vehicle over a surface. One is to utilize an air cushion which supports a device over a prepared surface with very close clearances in the manner of an air bearing. In the other, an air cushion of low pressure air supports the device over an unprepared surface sufficiently to clear obstacles thereon by the use of a plenum chamber, peripheral jets and/or flexible skirts.

The use of precision air bearing system for providing a device with random horizontal movement over a large working area is very costly because of the need to grind large floor areas to precision tolerances. However, the air bearing techniques did result in a stable device with substantially no flutter, vibration, or pitching so long as the air flow did not raise the air gap over a few thousandths of an inch thick. A very thin film of air was required for good stability characteristics.

The low pressure air cushion system while operating in a generally satisfactory manner over a rough or unprepared surface has heretofore been subject to motions such as heaving, pitching, and yawing.

To overcome the disadvantage of the prior air cushion techniques, the present invention has been devised which enables an air cushion device to be inherently stable while operating with a substantial air gap over an unprepared surface.

SUMMARY OF THE INVENTION

In the present invention a pad has a plenum chamber defined by an enclosing side wall skirt and an upper wall converging downwardly to form an inverted truncated cone. The load supported by the pad is applied to the upper wall at the truncated cone center so that the load application to the pad is below the resultant of the air lift forces.

Accordingly, it is an object of this invention to provide an improved air cushion device with superior stability.

Another object is to provide an improved air cushion vehicle which operates on ordinary surfaces with great stability.

Other objects and advantages of the present invention will become more apparent from the following detailed description when taken in conjunction with the accompanying drawings.

DESCRIPTION OF THE PRESENTLY PREFERRED EMBODIMENT

Figure 1:
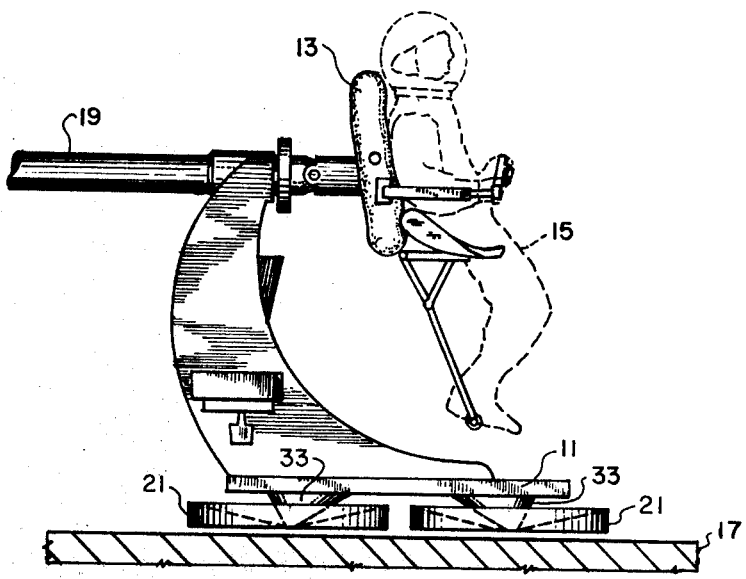
FIG. 1 is a side view of a test type platform supported by several air cushion pads of the present invention.

FIG. 1 illustrates a platform simulator 11 used to perform certain mechanical space simulation experiments. The platform 11 carries a seat 13 for a human 15 and is adapted to move in random horizontal movements over a surface 17 in accordance with a force applied by a connecting link 19. The platform 11 is provided with several air cushion pads 21, con- lows the platform 11 to move in a substantially frictionless manner on a rough finished surface 17.

Figure 2:
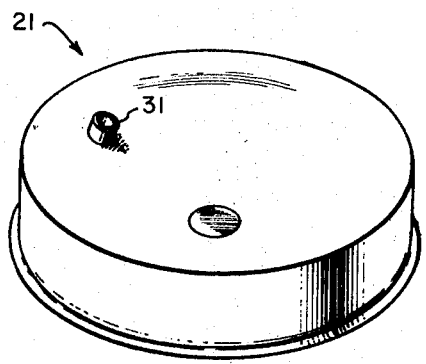
FIG. 2 is a perspective view of an air cushion pad being used in FIG. 1.
Figure 3:
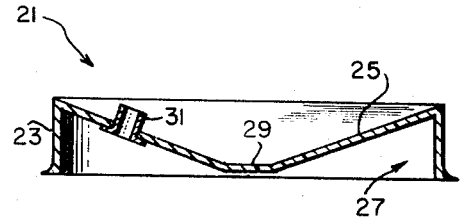
FIG. 3 is an elevational cross-sectional view of the air cushion pad of FIG. 2.

One of the air cushion pads 21 is shown in perspective in FIG. 2 and in cross section in FIG. 3. The pad 21 has an enclosing (circular) vertical side wall 23 and an upper wall 25 converging downwardly from the upper end of the side wall so as to form an inverted truncated cone within a plenum chamber 27. The center portion 29 of the upper wall, i.e. truncated cone, is flat and orientated perpendicular, (horizontal) to the vertical side wall 23.

A tubular fitting 31 extends through the upper wall 25 so that a conventional type hose (not shown) may deliver pressurized air into the plenum chamber 27. While only one fitting is shown, others could be provided if additional air flow was desired. Further, the fitting 31 could be integral with the wall 25, if desired.

Figure 4:
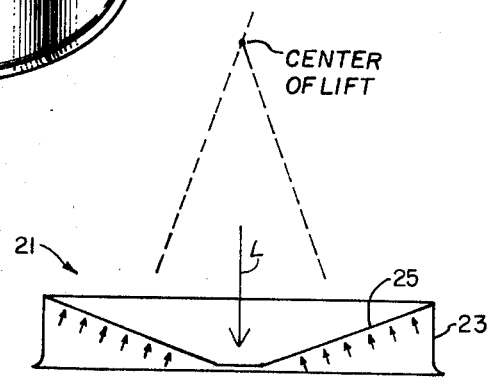
FIG. 4 is a schematic view of the air cushion pad of FIG. 2 illustrating the forces acting thereon.

As indicated by FIG. 1, the weight of the platform 11 is placed upon the depressed flat center 29 of the upper air cushion pad surface 25 by struts 33. The struts 33 may be secured by any suitable means such as welding or adhesively bonding to the pads 21. Also, the struts 33 may be pivotally joined to the center 29 of the pads 21 to enable a pad to tilt independently of the other pads. In FIG. 4, the load (L) placed upon the flat center 29 of the air cushion pad 21 by the platform 11 is shown as an arrow. The air pressure exerted on the bottom surface of the upper inverted truncated cone shaped wall 25 is represented by numerous small arrows. All the pressure forces are focused by the shape of the upper wall 25 toward a center which is above the load (L) application to the air cushion pad 21. This results in a very stable air cushion pad 21 which unlike a conventional air bearing will not flutter or vibrate when floated a significant distance from the floor. For example, an air cushion pad constructed of plastic and having a diameter of 24 inches, a vertical side wall of 4 inches, a center flat portion with a diameter of 3 inches and wall thicknesses of 0.13 inches lifted 0.02 inches from the floor with an air flow 70 c.f.m. with no significant vibrations. The pad 21 is designed to float 0.125 inches off the floor under a 20 pound load with an air flow of 415 c.f.m.

The superior horizontal stability of the pad 21 is not entirely explained because the load acting on the pad is below its center of lift. Since the vertical lift is perpendicular to the surface 17, the tilting of the pad 21 will cause the vertical lift component acting on the inner surface of the upper wall 25 to decrease on the high side and increase on the low side thereby causing a corrective torque tending to stabilize the pad along the horizontal. In reference to the angle $\Phi$ between the horizontal and the inner surfaces of the upper wall 25, the vertical lift will decrease by the change in the cosine function of the angle $\Phi$ on the high side and increase by the change in the cosine function of the angle $\Phi$ on the low side.

Further, the normal stability achieved by air cushion devices because of pressure differentials in a tilting attitude is present, which adds to the inherent stability caused by the specific design of the present invention. The stability achieved by the present invention is that normally associated with precision air bearings on precision surfaces under designed air flow.

Obviously, many modifications and variations of the present invention are possible in light of the above teachings. It is, therefore, to be understood that within the scope of the appended claims the invention may be practiced other than as specifically described.

We claim:

1. A vehicle adapted to be supported in a substantially frictionless manner over an unprepared surface, comprising:
    a platform adapted for carrying a load thereon;
    an air cushion pad adapted to support said platform;
    said air cushion pad having an upper wall and an enclosing side wall defining an open bottom plenum chamber;
    said upper wall sloping upwardly from a central portion to the surrounding upper edge of said enclosing side wall;
    inlet means extending through the sloping portion of said for blowing pressurized air into said plenum chamber so as to cause the pad to hover over the surface; and said central portion serving as a load bearing portion for a strut secured at its lower end thereto, said strut being secured at its upper end to the platform whereby the load of the platform is applied to the central portion of said pad so as to be below the resultant pressure force caused by the air in the plenum chamber.

2. A vehicle as defined by claim 1 including a plurality of such air cushion pads supporting said platform.

3. The vehicle as defined by claim 1 wherein said central portion of the upper wall of said air cushion pad is located contiguous to the open bottom level defined by the surrounding lower edge of the enclosing side wall whereby the plenum chamber is effectively compartmented so to slow the air flow between air pressure differentials caused by a tilting of the pad relative to the unprepared surface so as to tend to prevent pitching and vibration of the pad.

4. A vehicle as defined by claim 3 wherein said enclosing side wall has a smooth, even interior surface which is adapted to be substantially perpendicular to the surface the vehicle operates over, and the interior surface of said sloping upper wall being smooth and even between said central portion and the surrounding upper edge of said enclosing side wall.

5. A vehicle as defined by claim 4 including several of such air cushion pads supporting said platform.

6. A vehicle as defined by claim 4 wherein said enclosing side wall is circular.

7. An air cushion pad adapted to operate over an unprepared surface without heaving, pitching, and yawing, comprising:

a housing having an upper wall and an enclosing side wall defining an open bottom plenum chamber;

said upper wall sloping upwardly from a central portion to the surrounding upper edge of said enclosing side wall;

said central portion being located contiguous to the open bottom level defined by the surrounding lower edge of the enclosing side wall so the plenum chamber is effectively compartmented so as to slow the air flow between air pressure differentials caused by a tilting of the pad relative to the unprepared surface whereby the pad does not tend to vibrate;

inlet means extending through the sloping portion of said upper wall between said central portion and said side wall for blowing pressurized air into said plenum chamber so as to cause the pad to hover over the unprepared surface; and said central portion having a load applying means adapted to support the entire load placed on the pad so that load application is below the resultant pressure force caused by the air in the plenum chamber acting on the interior surface of the sloping wall of said housing.

8. An air cushion pad as defined by claim 7 wherein:

the interior surface of said sloping upper wall being smooth and even between said central portion and the surrounding upper edge of said enclosing side wall; and said enclosing side wall having a smooth and even interior surface which is adapted to be substantially perpendicular to the unprepared surface the pad operates over.

9. An air cushion pad as defined by claim 7 wherein said enclosing side wall is circular.